United States Patent [19]

Sircar

[11] Patent Number: 4,790,858
[45] Date of Patent: Dec. 13, 1988

[54] FRACTIONATION OF MULTICOMPONENT GAS MIXTURES BY PRESSURE SWING ADSORPTION

[75] Inventor: Shivaji Sircar, Wescosville, Pa.

[73] Assignee: Air Products and Chemicals, Inc., Allentown, Pa.

[21] Appl. No.: 149,808

[22] Filed: Jan. 29, 1988

[51] Int. Cl.$^4$ ............................................. B01D 53/04
[52] U.S. Cl. .......................................... 55/26; 55/58; 55/62; 55/68; 55/75
[58] Field of Search .................. 55/25, 26, 31, 33, 58, 55/62, 68, 74, 75

[56] References Cited

U.S. PATENT DOCUMENTS

| | | | |
|---|---|---|---|
| Re. 31,014 | 8/1982 | Sircar | 55/26 |
| 2,918,140 | 12/1959 | Brooks | 55/58 |
| 3,085,379 | 4/1963 | Kiyonaga et al. | 55/58 X |
| 3,252,268 | 5/1966 | Stark | 55/25 |
| 3,986,849 | 10/1976 | Fuderer et al. | 55/25 |
| 4,171,206 | 10/1979 | Sircar | 55/26 |
| 4,299,596 | 11/1981 | Benkmann | 55/26 |
| 4,512,780 | 4/1985 | Fuderer | 55/26 |
| 4,553,981 | 11/1985 | Fuderer | 48/62 R |
| 4,661,125 | 4/1987 | Haruna et al. | 55/26 |
| 4,705,541 | 11/1987 | Sircar | 55/26 |
| 4,726,816 | 2/1988 | Fuderer | 55/26 |
| 4,737,167 | 4/1988 | Ohtani et al. | 55/26 |

Primary Examiner—Robert Spitzer
Attorney, Agent, or Firm—Geoffrey L. Chase; William F. Marsh; James C. Simmons

[57] ABSTRACT

Multicomponent gas mixtures containing (1) hydrogen as a primary component, (2) a secondary key component that is more strongly sorbed by the adsorbent than hydrogen and (3) a minor quantity of one or more dilute components less strongly sorbed than the secondary key component, are subjected to selective adsorption in an integrated adiabatic pressure swing adsorption (PSA) system having three groups of adsorbent columns interconnected for controlled series gas flow from a selected column of one group to a selected column of another group. In the disclosed example, directed to treatment of a shift converter effluent from a hydrocarbon reforming plant, contained carbon dioxide is selectively adsorbed in and recovered from a column of the first group. The minor dilute components (such as $CH_4$ and/or CO) are retained by adsorption in a column of the second group, thus permitting recovery therefrom of unsorbed high purity hydrogen. By depressurizing and purging of the impurity-laden column of the second group with high purity hydrogen, an effluent stream is obtained, comprised of hydrogen and desorbed minor components. This stream is passed through a column of the third group wherein the contained minor components are sorbed and a further amount of high purity hydrogen is recovered as effluent.

7 Claims, 2 Drawing Sheets

COLUMN OPERATING SCHEDULE

A = ADSORPTION
HR = HIGH PRESSURE RINSE
D = DESORPTION
E = EVACUATION
P = PRESSURIZATION
LR = LOW PRESSURE RINSE

4,790,858

FRACTIONATION OF MULTICOMPONENT GAS MIXTURES BY PRESSURE SWING ADSORPTION

TECHNICAL FIELD

The present invention relates generally to the separation and recovery of individual components of gas mixtures by pressure swing adsorption and is especially concerned with enhancing recovery of a primary component, such as hydrogen in particular, from such gas mixtures.

BACKGROUND OF THE INVENTION

Prior U.S. Pat. No. 4,171,206 describes a pressure swing adsorption process (PSA) which can be used for fractionation of a multicomponent gas mixture composed of (1) a bulk primary component, (2) a bulk secondary key component that is more strongly sorbed by the adsorbent than is the primary component and (3) a minor quantity of one or more dilute components less strongly sorbed than the secondary key component. The patent describes by way of example application of the disclosed process to production and recovery of pure hydrogen and $CO_2$ from a steammethane reformer (SMR) off gas after high temperature shift. Such shifted product typically contains about 20% $CO_2$, 3.5% $CH_4$, 0.5% CO and about 76% $H_2$, available at a pressure of about 250 psig. In a typical run made by the process of the patent such mixed gas was resolved to obtain a primary hydrogen product of 99.999+% $H_2$ purity at about 87.1% $H_2$ recovery, and a secondary $CO_2$ product containing 99.4% $CO_2$ at about 94.0% recovery. The waste stream contained about 8.1% $CO_2$, 20.7% $CH_4$, 5.7% CO and 65.3% $H_2$. Other runs carried out by the patented method produced on the average a pure primary hydrogen product (99.9+% $H_2$) at about 91% yield and a secondary pure $CO_2$ product (99.9+% $CO_2$) at almost 100% recovery, with a resulting tertiary product comprised of 59% $H_2$, 36% $CH_4$, about 4% CO and only a trace of $CO_2$.

The present invention provides an improvement over the process disclosed in the cited prior U.S. Pat. No. 4,171,206 whereby the yield of recovered high purity primary product, such as hydrogen, is substantially increased.

SUMMARY OF THE INVENTION

As hereinabove indicated, after separation and recovery of hydrogen and $CO_2$ by the patented process, there is left a tertiary mixed gas stream containing about 60% hydrogen which can be utilized as fuel. In accordance with the present invention the total yield of high purity hydrogen is substantially increased by further recovery of a major portion of the hydrogen content of the tertiary product stream. As in the cited prior patent process, after removal of most of the $CO_2$ from the initial mixed gas stream charged at superatmospheric pressure to the PSA system in a first adsorbent column (A) followed by removal of minor impurities (such as $CH_4$ and CO) in a second adsorbent column (B), the second column is regenerated by lowering the pressure therein to near ambient level and then purging the column with a stream of the recovered pure primary component ($H_2$). In practice of the present invention, however, instead of discharging from the PSA system the effluent tertiary stream obtained in regeneration of the second adsorbent column as advocated in the patent process, the tertiary gas stream is subjected to further selective adsorption in an integrated third group of adsorbent columns (C) to remove contained impurities and further recovery of essentially pure hydrogen therefrom.

The operation of the invention will be understood and the advantages afforded thereby more fully appreciated from the detailed description which follows read in connection with the accompanying drawings illustrating a practical embodiment in which the invention may be practiced.

DETAILED DESCRIPTION

Figure 1:
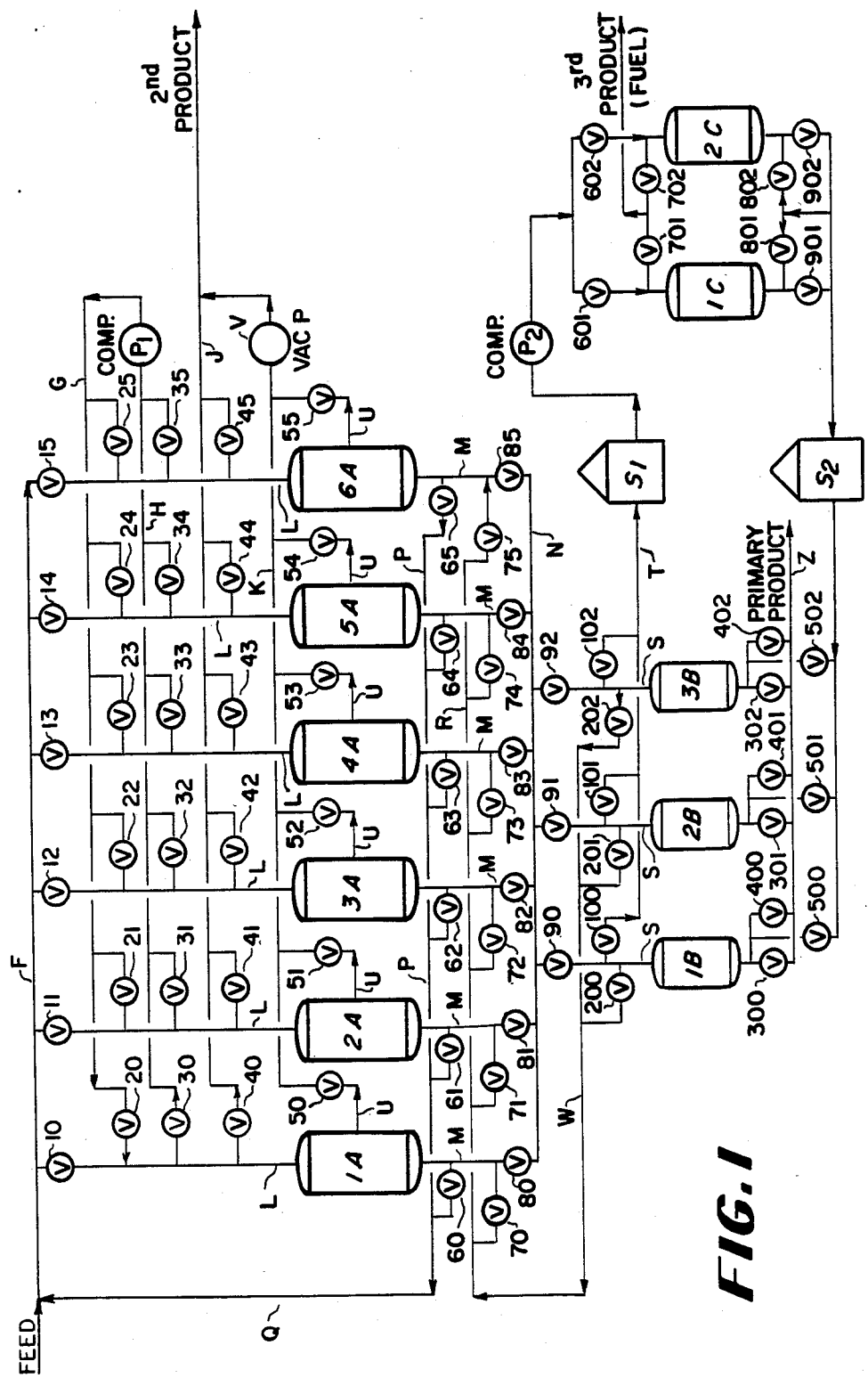
FIG. 1 of the accompanying drawings is a flow diagram of a preferred embodiment employing six parallel adsorbent columns with connecting conduits to a second group of three-parallel adsorbent columns, which in turn are arranged for gas flow communication with a selected one or the other of a third group having two parallel adsorption columns.

As shown in the drawings, the adsorption columns of the first parallel group are labeled in numerical sequence, respectively 1A through 6A. The columns of the second group are labeled respectively 1B, 2B and 3B while the two columns of the third group are labeled 1C and 2C, respectively. In addition to these adsorption columns, the illustrated PSA system further comprises compressors $P_1$ and $P_2$; a vacuum pump V, gas manifolds identified by letter designation, switching valves, gas surge or storage tanks ($S_1$ and $S_2$). The adsorption vessels of the three groups undergo a certain sequence of cyclic steps as summarized below. The operations of the A columns and the B columns are somewhat similar to that disclosed in the prior U.S. Pat. No. 4,171,206, pertinent portions of which are herein incorporated by references thereto. The operation of the C columns and its integration with the B columns is newly added.

CYCLE STEPS FOR A COLUMNS (a) ADSORPTION

The feed gas at superatmosphere pressure (50–500 psig) is passed through an A column which is packed with an adsorbent selective for retention of the secondary key component of the feed gas mixture. The unsorbed effluent then is passed through a B column in which components which are more selectively adsorbed than the primary key component are retained and the discharged stream is the unsorbed primary product effluent. This ADSORPTION step is continued until the adsorbent in the A column is about saturated with the feed gas mixture.

During the adsorption step feed gas from manifold F is introduced into the selected one of the A columns via a connecting line L. Unsorbed gas is discharged into a selected one of the B columns through line M manifold N and connecting line S. The unsorbed primary product is discharged into manifold Z.

(b) HIGH PRESSURE RINSE

At the termination of ADSORPTION step, flow communication between the A and B columns is discontinued and a stream of previously recovered high purity secondary key component is passed at or slightly above feed pressure through the A column in a direction concurrent to that of the initial feed. The resulting effluent (similar largely to feed composition) is recirculated by mixing it with fresh feed being charged to another A column of the group then on step (a). The rinse step is continued until the A column is essentially saturated with the pure secondary key component.

During this step (b) the secondary key component employed as the rinse gas from manifold H is compressed at $P_1$ and is passed through manifold G and connecting line L into the A column, discharging therefrom via line M and manifold P into recycle line Q whereby the rinse gas effluent is discharged into feed manifold F.

(c) DESORPTION

Following the rinse step the A column is depressurized to near ambient level by gas withdrawal therefrom in direction countercurrent to step (a). The effluent is high purity secondary key component part of which is compressed to the feed pressure to supply rinse gas for a companion A column and the remainder is withdrawn as enriched secondary product. The compression of the effluent gas can be carried out as it is being produced without letting the pressure down to ambient. The recirculated portion of the withdrawn gas is discharged from the A column via line L into manifold H and after compression at $P_1$ flows into manifold G for supply of the gas to a companion A column. The other portion of the withdrawn gas is discharged as secondary product through manifold J.

(d) EVACUATION

The column that has been brought to about ambient pressure level by step (c) is now evacuated, thereby desorbing further quantities of the secondary component in a direction counter to that of initial feed. During this step the gas flow path out of the A column is via manifolds U and K and vacuum pump V discharging the desorbed secondary product into manifold J.

(e) PRESSURIZATION

The evacuated A column is brought to an intermediate pressure level by connecting it with a column (B) of the second group the undergoing step (2) as set out below, until the connected columns are at a substantially equal pressure. Gas flow into the A column is countercurrent to that of the initial feed. The path of flow from the B column into the A column is via manifolds W and R into line M.

(f) FINAL PRESSURIZATION

The A column is brought to the high adsorption pressure of step (a) by introduction countercurrently to feed of part of the high purity hydrogen effluent discharged from a column of the B group. The initial A column is now ready for repetition of the cycle beginning with step (a). The repressurization is effected with primary product gas passing into and through a B column which is also being brought to feed pressure level.

CYCLE STEPS FOR B COLUMNS (1) ADSORPTION

As indicated in (a) above the unsorbed effluent from an A column then on step (a) is passed directly into and through a communicating B column, which is packed with an adsorbent or layers of adsorbents selective for adsorption of the secondary key component as well as of the dilute impurities of the feed gas. The unsorbed effluent discharged from the B column during this step is the high purity primary component. This step is continued until the feed impurities (non-primary key components) have begun to break through at the discharge end of the B column or somewhat short of imminent breakthrough. The path of flow of the gas leaving an A column via line M is through manifold N and connecting line S into the B column, discharging from the column into manifold Z.

(2) DESORPTION (I)

The B column is brought to an intermediate pressure level by gas withdrawal therefrom countercurrent to feed direction, the withdrawn gas being introduced into an A column then undergoing step (b). The path of gas flow out of the B column is through manifolds W and R into connecting line M.

(3) DESORPTION (II)

Countercurrent desorption of the B-column is continued to a second intermediate pressure level, the withdrawn gas being introduced into a companion B column then undergoing step (6).

(4) DESORPTION (II)

Countercurrent desorption of the B-column is continued to near ambient pressure level, the effluent being vented to surge tank $S_1$ for use as feed to the C columns.

(5) PURGING

Following step (4) part of the recovered high purity primary product from a C column is passed through the B column countercurrent to feed direction. The purge effluent is introduced into a surge tank for later use as feed to the C columns.

(6) PRESSURIZING

The pressure in the purged B column is brought to an intermediate level by gas flow connection with a companion B column there undergoing step (3). The gas enters the column concurrent to feed direction.

(7) FINAL PRESSURIZING

Flow communication is again established between B column that has completed step (6) and an A column that has completed step (e) for countercurrent flow of part of the recovered high purity primary effluent produced in step (a) into and through the B column into the A column, restoring these columns to initial adsorption pressure for repetition of the cycle starting with step (a).

CYCLE STEPS FOR C COLUMNS (i) ADSORPTION

The desorption III (step 4) and purge (step 5) effluents from column B withdrawn from surge or storage vessel $S_1$ is compressed to a pressure in the range of 50–300 psig and passed into one or the other of the C columns for purification and recovery of pure primary component. Each of the C columns is packed with an adsorbent (or layers of adsorbents) selective for adsorption of secondary component and dilute impurities present in the feed gas. The unsorbed effluent is discharged from the C column (essentially pure primary component), part of which is stored in $S_2$ and used to purge a B column undergoing step (5), and the remaining gas is used to purge and pressurize the companion C column (during steps (iii) and (iv).

(ii) DESORPTION

Following step (i) gas is withdrawn from the column countercurrent to feed direction, reducing the column pressure to near ambient level (0–10 psig). The effluent constitutes the tertiary product stream from this process and may be recovered for use as fuel.

(iii) PURGING

Part of the recovered high purity primary key component product from the C column is passed through another C column countercurrent to feed direction and at near ambient or slightly elevated (0–10 psig) pressure. The purge effluent forms parts of the tertiary products stream and contains primary key component, some secondary key component and all of the dilute impurities of the initial feed gas mixture.

(iv) PRESSURIZING

The purged C column is brought back to the operating adsorption pressure of step (i) by introduction in a direction countercurrent to feed direction of the high purity primary key component produced during step (i), for repetition of the described cycle for column C operating sequence. During the time that one of the C columns is undergoing the adsorption step (i) the companion column goes through steps (ii) through (iv).

Figure 2:
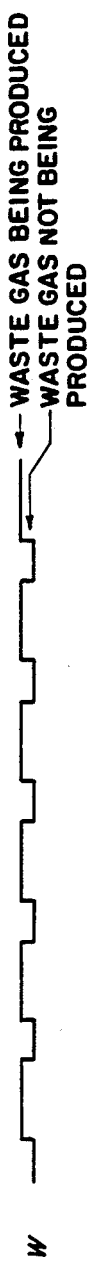
FIG. 2 is an operating schedule of a preferred cycle sequence for practice of the invention.

FIG. 2 of the accompanying drawings is a preferred column operation schedule that may be employed in practice of the invention. The illustrated table is based on an arbitrary 18-minute total cycle time. Other cycle times may be employed. Although not limited thereto the advocated system, as illustrated in FIG. 1, requires 6 A columns, 3 B columns and 2 C columns in the described cycle for continuous operation of pumps and compressors; however, other arrangements may be employed if interrupted or discontinuous operation (using idling) of pumps or compressors is acceptable. Other arrangements may also be employed by proper design of the cycle times of the various steps in the process.

The positions of the valves during the operating cycle are set out in Table 1. The designation O indicates that the valve is open. A blank represents a closed valve. It may be seen from FIG. 2 and Table 1, that while the A columns go through one complete cycle, the B columns go through two complete cycles and the C columns go through three complete cycles. Thus the B columns perform double duty and the C columns perform triple duty to handle feed gas during every cycle of A columns. This is an important feature of this invention which substantially reduces the adsorbent inventory. The curve W in FIG. 2 shows when the C columns are producing the waste gas. It may be seen that the present design of the cycle produces an almost continuous flow of the waste gas. The gas is produced during 67% of the total cycle.

TABLE 1

| Time (Mins) | \multicolumn{28}{c}{VALVE NOs. A COLUMNS} |
|---|---|---|---|---|---|---|---|---|---|---|---|---|---|---|---|---|---|---|---|---|---|---|---|---|---|---|---|---|
| | 10 | 11 | 12 | 13 | 14 | 15 | 20 | 21 | 22 | 23 | 24 | 25 | 30 | 31 | 32 | 33 | 34 | 35 | 40 | 41 | 42 | 43 | 44 | 45 | 50 | 51 | 52 | 53 | 54 |
| 0-1 | o | | | | | | | | | | o | | | | o | | | o | | | | o | | | | o | | | |
| 1-2 | o | | | | | | | | | | o | | | | o | | | o | | | | o | | | | o | | | |
| 2-3 | o | | | | | | | | | | o | | | | o | | | o | | | | o | | | | o | | | |
| 3-4 | | o | | | o | | | | | | | | | | | | o | | | | o | | | | | | o | | o |
| 4-5 | | o | | | o | | | | | | | | | | | | o | | | | o | | | | | | o | | o |
| 5-6 | | o | | | o | | | | | | | | | | | | o | | | | o | | | | | | o | | o |
| 6-7 | | | o | | | | | o | | | | | o | | | | | | o | | | | | | | | | | |
| 7-8 | | | o | | | | | o | | | | | o | | | | | | o | | | | | | | | | | |
| 8-9 | | | o | | | | | o | | | | | o | | | | | | o | | | | | | | | | | |
| 9-10 | | | | o | | | | | o | | | | | o | | | | | | o | | | | | o | | | | |
| 10-11 | | | | o | | | | | o | | | | | o | | | | | | o | | | | | o | | | | |
| 11-12 | | | | o | | | | | o | | | | | o | | | | | | o | | | | | o | | | | |
| 12-13 | | | | | o | | | | | o | | | | | o | | | | | | o | | | | | o | | | |
| 13-14 | | | | | o | | | | | o | | | | | o | | | | | | o | | | | | o | | | |
| 14-15 | | | | | o | | | | | o | | | | | o | | | | | | o | | | | | o | | | |
| 15-16 | | | | | | o | | | | | o | | | | | o | | | | | o | | | | | | o | | |
| 16-17 | | | | | | o | | | | | o | | | | | o | | | | | o | | | | | | o | | |
| 17-18 | | | | | | o | | | | | o | | | | | o | | | | | o | | | | | | o | | |

| Time (Mins) | \multicolumn{14}{c}{VALVE NOs. A COLUMNS} | \multicolumn{7}{c}{B COLUMNS} |
|---|---|---|---|---|---|---|---|---|---|---|---|---|---|---|---|---|---|---|---|---|---|
| | 55 | 60 | 61 | 62 | 63 | 64 | 65 | 70 | 71 | 72 | 73 | 74 | 75 | 80 | 81 | 82 | 83 | 84 | 85 | 90 | 91 | 92 | 100 | 101 | 102 | 200 |
| 0-1 | | | | | o | | o | | | | | | o | | | | | | o | | | | o | | | |
| 1-2 | | | | | o | | | | | | | | o | | | | | | o | | | | | | | |
| 2-3 | | | | | o | | | | | | | | o | o | | | | | o | o | | | | | o | |
| 3-4 | | o | | | | | | | o | | | | o | | | | | | o | | | | | | o | o |
| 4-5 | | o | | | | | | | | | | | o | | | | | | o | | | | | | | o |
| 5-6 | | o | | | | | | | | | | | o | o | | | | | o | o | o | | | | | |
| 6-7 | o | o | | | | | | | | o | | | | o | | | | | | o | o | | | | | |
| 7-8 | o | o | | | | | | | | | | | | o | | | | | | o | | | | | | o |
| 8-9 | o | o | | | | | | | | | | | | o | o | | | o | | o | | | o | | |
| 9-10 | | | o | | | | | | | o | | | | o | | | | | o | o | | | o | | | |
| 10-11 | | | o | | | | | | | | | | | | o | | | | | o | | | | | | |
| 11-12 | | | o | | | | | | | | | | | o | o | | o | | o | | | | o | | |
| 12-13 | | | | o | | o | | | | | | | | | o | | o | | o | | | | o | | | o |
| 13-14 | | | | o | | | | | | | | | | | o | | o | | | | | | | | | o |
| 14-15 | | | | o | | | | | | | | | | | o | o | o | o | o | | | | | | | |
| 15-16 | | | | | | o | o | | | | | | | | o | | | | o | o | | | | | | |
| 16-17 | | | | | | o | | | | | | | | | o | | | | o | | | | | | | o |
| 17-18 | | | | | | o | | | | | | | o | | | o | o | | o | o | | | o | | |

| Time (Mins) | \multicolumn{11}{c}{VALVE NOs. B COLUMNS} | \multicolumn{8}{c}{C COLUMNS} |
|---|---|---|---|---|---|---|---|---|---|---|---|---|---|---|---|---|---|---|---|
| | 201 | 202 | 300 | 301 | 302 | 400 | 401 | 402 | 500 | 501 | 502 | 601 | 602 | 701 | 702 | 801 | 802 | 901 | 902 |
| 0-1 | | o | o | | | | | | | o | | o | | | | | o | o | |
| 1-2 | o | o | o | | | | | | | | | | o | | | | | | |
| 2-3 | | | o | | | | o | | | | | | o | o | | o | | | o |
| 3-4 | | | | o | | | | | | | o | o | | | o | | | | o |
| 4-5 | | o | | o | | | | | | | | | | o | | | | | |
| 5-6 | | | | o | | | o | | | | | o | | | o | | o | o | |
| 6-7 | o | | | | o | | | o | | | | o | | | | | | o | |
| 7-8 | o | | | | o | | | | | | | | o | | | | | | |

TABLE 1-continued

|       | 1 | 2 | 3 | 4 | 5 | 6 | 7 | 8 | 9 | 10 | 11 | 12 |
|-------|---|---|---|---|---|---|---|---|---|----|----|----|
| 8-9   |   |   |   | o | o |   |   |   | o | o  | o  | o  |
| 9-10  |   | o | o |   |   |   | o |   | o | o  |    | o  |
| 10-11 | o | o | o |   |   |   |   |   |   | o  |    |    |
| 11-12 |   |   | o |   | o |   |   | o |   | o  | o  | o  |
| 12-13 |   |   | o |   |   |   | o | o |   |    | o  | o  |
| 13-14 |   | o | o |   |   |   |   |   | o |    |    |    |
| 14-15 |   |   | o |   | o |   |   | o | o | o  |    | o  |
| 15-16 | o |   | o |   | o |   |   | o |   | o  |    | o  |
| 16-17 | o |   | o |   |   |   |   |   |   |    | o  |    |
| 17-18 |   |   |   | o | o |   |   | o |   | o  | o  | o  | o = open

Among alternative arrangements that may be used, for example, is one in which the C columns are operated in a sequence using the steps of adsorption, pressure equalization with another column, desorption to ambient pressure level, and purge with pure primary key component product followed by pressurization with pure primary key component product. For this arrangement, three C columns are required for continuous operation.

A principal difference between the present invention and the operation disclosed in the earlier U.S. Pat. No. 4,171,206 is the recompression and purfication of the effluent discharged from the B columns during desorption and rinsing of these columns, followed by extraction of the pure primary key component from the purge effluent by selective adsorption of non-primary key component impurities therefrom. The extracted pure primary key component stream provides the purge gas employed for the B columns, with the consequent enhanced total primary key component recovery in the overall PSA process. For example, hydrogen recovery from SMR off gas described in the earlier patent (91.1% at 99.9% purity) can be raised to about 95.0% $H_2$ recovery at the same high purity in accordance with the present invention.

As in the prior cited patent an important application of the present invention is in the separation of the components of a hydrogen-rich gas mixture such as the gaseous effluent from a shift converter in a hydrocarbon reforming plant, wherein high purity hydrogen is recovered as the primary component and $CO_2$ is obtained as the secondary bulk component; the remaining dilute impurities such as CO and $CH_4$ being removed as the tertiary gas mixture.

Another example is the production of high purity $H_2$(primary) and CO (secondary) products from a synthesis gas feed containing bulk CO and $H_2$ with dilute amounts of $CH_4$, $N_2$ and argon impurities. The tertiary (fuel) product in this case will consist of a mixture of CO, $CH_4$, $N_2$, Ar and some $H_2$.

A third example is purification of a feed gas containing bulk $CO_2$, $N_2$ and $H_2$ with dilute CO and $CH_4$ impurities. The process can be run to produce an $N_2$ and $H_2$ mixture as the primary product, $CO_2$ as the secondary product and a mixture of $CO_2$, CO, $CH_4$, $N_2$ and $H_2$ as the tertiary product. Such a gas can be produced by primary reformation of naphtha or natural gas followed by secondary reformation using air and then subjecting the reformed gas to a shift reactor. The primary product in this case is an ammonia synthesis gas and the secondary product is $CO_2$. This system will be very attractive for production of urea by reacting $NH_3$ and $CO_2$.

Adsorbents employed in the several columns will depend on the composition of the initial gas mixture treated. For the treatment of SMR off gas for production of pure hydrogen and pure $CO_2$ each of the three sets of columns may be packed with A, X or Y zeolites ion-exchanged with alkali metal or alkaline earth metal cations in single ion or binary ion exchange forms. Activated carbons, aluminas and silia gels can be used when these adsorbents provide the desired selectivity of adsorption for the gas mixture to be separated.

Other advantages provided by the present invention include the following:

I. The adsorption step in the C columns cn be run at a much lower pressure than that of the A and B columns, with savings in compression power.

II. The B columns can be purged at near ambient pressure (0-1 psig) obtaining highly efficient purge cleanup at reduced purge gas requirement. This is made possible because the purge effluent from the B columns is not intended to be used for fuel or other purposes so that the purge effluent need not be made available at moderate pressure (5-10 psig).

III. The C column can, if desired, be purged at 5-10 psig to provide a fuel gas at that pressure without much penalty because the pressure energy is already available (by supplied recompression of the feed to the C columns).

IV. By matching the duration of the adsorption step in the C columns with those of the desorption and purging steps of the B columns, the required size of mixing tank $S_1$ can be reduced or eliminated.

EXAMPLE

The pressure swing adsorption cycle described above was run in a system containing the A, the B and the C columns. The feed gas contained 75.4% $H_2$, 19.88% $CO_2$, 0.96% CO and 3.73% $CH_4$. The feed gas pressure was 18.0 atmospheres and it was at 21° C. The A columns were packed with an "X" zeolite while the B and the C columns were packed with a layer of "X" zeolite and a layer of an "A" zeolite. The C columns were run at an adsorption pressure of 7.80 atmospheres. The net $H_2$ product recovery from the system was 95.2% and its purity was 99.99+% $H_2$. The $CO_2$ recovery was 94.0% and its purity was 99.4% $CO_2$. The waste gas was produced at 1.30 atmospheres and it contained approximately 43.2% $H_2$, 13.3% $CO_2$, 9.3% CO and 34.2% $CH_4$ which has a good BTU value. The same feed gas when treated with the PSA process disclosed in U.S. Pat. No. 4,171,206 produced a 99.99+% $H_2$ product with a $H_2$ recovery of only 87.1%. Thus, the PSA process of current invention produces $H_2$ with a much higher recovery at the same purity, which is a significant performance improvement.

What is claimed is:

1. In the separation of a multicomponent feed gas mixture with the individual recovery of a primary key component and a secondary key component present in such mixture, by selective sorption, wherein said secondary key component is more strongly adsorbed than the primary key component and there is present in said mixture at least one minor dilute tertiary gas component less strongly sorbed than the secondary key component; the method which comprises, in an adiabatic adsorption pressure swing cycle the steps of:

(a) passing such multicomponent gas mixture at initial super-atmospheric pressure and in selected flow direction through a first sorbent column (A) packed with an adsorbent selected for preferential retention of said secondary key component and then passing the effluent from said first column through a second sorbent column (B) packed with an adsorbent selective for retention of said tertiary component(s) as opposed to said prima key component, and discharging from said second sorbent column unadsorbed primary key component, said passing of the multicomponent gas mixture being continued for a controlled time period until or short of breakthrough of said secondary key component from said first sorbent column, while retaining all of the said tertiary components in said second sorbent column;

(b) thereafter discontinuing gas flow communication between said first and second sorbent columns, and
  (i) rinsing said first column by flowing a stream of relatively pure secondary key component therethrough at substantially the initial feed pressure level for a controlled time period effective to purge most of the void and displaced gases from the said first column, and during this time period (b),
  (ii) lowering the pressure in said second column to an intermediate level by withdrawing a gas stream therefrom including void and desorbed gases, and thereafter;
  (iii) further depressuring said second column to near ambient pressure followed by:
  (iv) purging the second column at near ambient pressure with a stream of primary key component;

(c) after said rinsing step in (b) above reducing the pressure in said first column to an intermediate level by desorption of gas therefrom including previously sorbed secondary key component and during this step (c), repressuring the second column to an immediate pressure level by flow thereinto of gas essentially free of the secondary key component;

(d) following step (c) above further desorbing gas from said first column to lower the pressure therein to substantially ambient level, and thereafter;

(e) evacuating said first column to subatmospheric level;

(f) after attaining the subatmospheric level in the said first column, introducing thereinto a gas stream substantially free of the secondary key component to bring said first column to an intermediate pressure level, and thereafter;

(g) further repressurizing said first column to initial super-atmospheric feed pressure level by flowing thereinto primary key product gas via a second column already pressurized to the intermediate pressure level (step c), thereby bringing both columns of the feed pressure level and making them ready to repeat the defined sequence of steps beginning with the reintroduction of the multicomponent feed gas mixture into the said first sorbent column; the improvement which comprises:

(h) passing to storage the gas withdrawn from a second column during the further depressuring of said second column to near ambient pressure;

(j) also passing to storage the effluent obtained in the purging of said second column with a stream of primary key component;

(k) withdrawing the gas stored during steps (h) and (j) and passing said withdrawn gas through a third adsorption column packed with adsorbent selective for adsorption of the secondary key component as well as said minor tertiary gas component, while collecting unsorbed gas discharged from said third column consisting essentially of primary key component;

(l) discontinuing passing of stored gas into said third column and countercurrently desorbing said column to near ambient pressure;

(m) at the attained near ambient pressure rinsing the third column countercurrently, using part of the unsorbed gas collected during step (k); and (n) repressuring the rinsed third column with another portion of the unsorbed gas collected during step k.

2. The improvement as defined in claim 1 wherein the adsorbent employed in said third adsorption column is comprised of X and A molecular sieves in consecutive layers.

3. The improvement as defined in claim 1 wherein said tertiary component comprises hydrogen and at least one gas from the group consisting of methane, carbon dioxide and carbon monoxide.

4. The improvement as defined in claim 3 wherein the adsorption step (k) in said third column is performed at a pressure in the range of 50–300 psig.

5. The improvement as defined in claim 3 wherein the desorption of said third column in step (1) is performed to bring said column to a pressure in the range of 0–10 psig.

6. The improvement as defined in claim 3 wherein said third adsorption column is one of a pair of such columns alternately placed on the adsorption step (k) of the recited cycle sequence.

7. The improvement as defined in claim 3 wherein said third column is one of a set of three operated in parallel in times sequence, each of said three columns undergoing in turn the steps of adsorption, pressure equalization by passage of withdrawn gas to a companion column of said set, further desorption by gas withdrawal to ambient pressure level, purging with recovered pure hydrogen followed by repressurizing to adsorption pressure level by introduction of pure hydrogen.

* * * * *

UNITED STATES PATENT AND TRADEMARK OFFICE
CERTIFICATE OF CORRECTION

PATENT NO. : 4,790,858

DATED : December 13, 1988

INVENTOR(S) : Shivaji Sircar

It is certified that error appears in the above-identified patent and that said Letters Patent is hereby corrected as shown below:

Column 9, Line 9
    Replace "selected" with -- selective --

Signed and Sealed this

Sixth Day of June, 1989

Attest:

DONALD J. QUIGG

*Attesting Officer*          *Commissioner of Patents and Trademarks*